Figure 6:
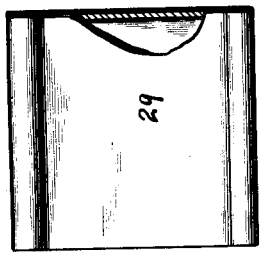

J. H. GRAVELL.
WELDING MACHINE.
APPLICATION FILED SEPT. 24, 1912.
1,066,726.
Patented July 8, 1913.
2 SHEETS—SHEET 1.
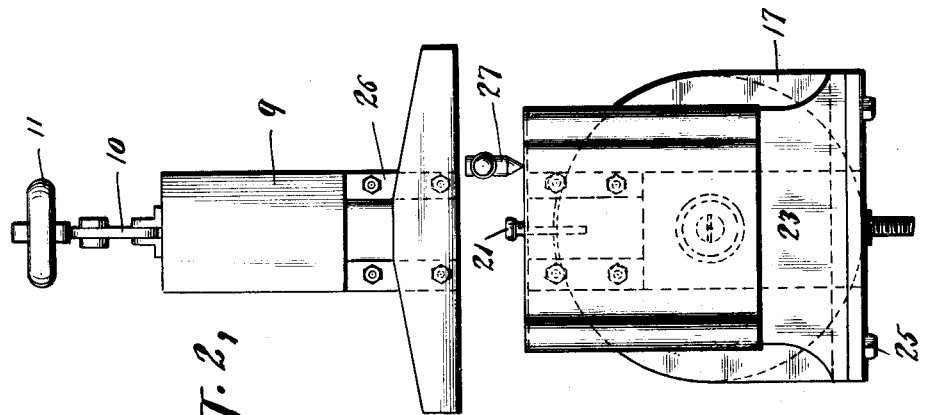
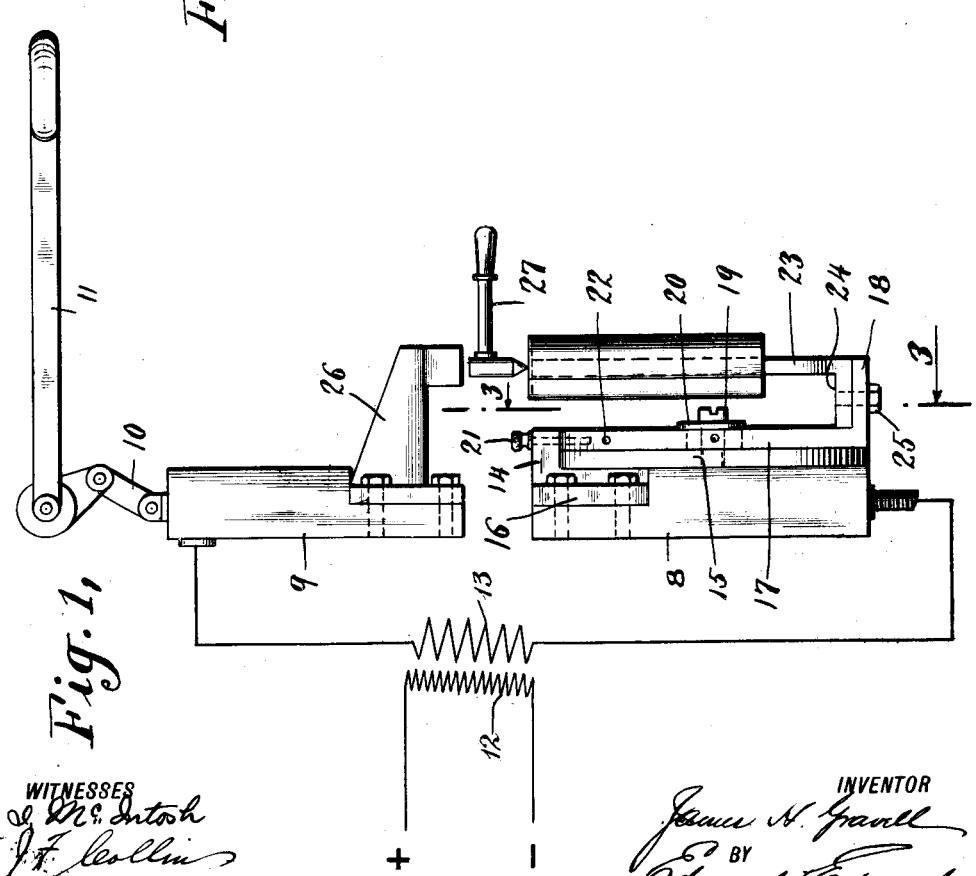

J. H. GRAVELL.
WELDING MACHINE.
APPLICATION FILED SEPT. 24, 1912.

1,066,726.

Patented July 8, 1913.
2 SHEETS—SHEET 2.

WITNESSES

INVENTOR
BY
ATTORNEYS

UNITED STATES PATENT OFFICE.

JAMES H. GRAVELL, OF PHILADELPHIA, PENNSYLVANIA, ASSIGNOR TO HALE AND KILBURN COMPANY, OF PHILADELPHIA, PENNSYLVANIA, A CORPORATION OF PENNSYLVANIA.

WELDING-MACHINE.

1,066,726.  Specification of Letters Patent.  Patented July 8, 1913.

Application filed September 24, 1912. Serial No. 722,055.

*To all whom it may concern:*

Be it known that I, JAMES H. GRAVELL, a citizen of the United States, residing at Philadelphia, in the county of Philadelphia and State of Pennsylvania, have invented certain new and useful Improvements in Welding-Machines, of which the following is a specification.

This invention relates to electric welding machines whereby two or more metallic parts may be secured together with an autogenous joint.

The invention is directed to the provision of an improved form of welding machine whereby metallic parts of a particular character may be conveniently and rapidly supported in position and manipulated during the process of welding.

The invention resides in the provision of improved work-supporting members on the terminals of an electric welding machine on which the parts to be welded may be conveniently assembled in the relative positions desired for making a weld, and manipulated so as to make welds at various points.

In accordance with the invention, one of the terminals of the machine, preferably the lower one, is provided with a work-supporting member which extends upwardly from its point of support and has its upper end spaced apart from the terminal on which it is mounted so that the work may be supported upon this member partially inclosing the same. This member is mounted so that it may be rotated relatively to the terminal, preferably about a horizontal axis located between the free end of the member and the point of support of the member upon the terminal.
The invention is of special utility in welding together the parts of metallic doors, particularly such doors as are used in the bodies of automobiles. These doors are commonly formed from two sheet-metal pieces, each of which is provided with a flange at its lateral edges except along one side. Two such flanged pieces are assembled with the flanges of one coacting with the flanges of the other and these flanges are secured together by welding them at a plurality of points. At one edge of the door, no such flange is provided, this edge being closed with a separate piece, if desired, after the hinges have been secured to the door in the proper position.

For welding together two sheet-metal parts for a door, the welding machine is provided with a work-supporting member electrically connected to one terminal and mounted upon the terminal with one end thereof displaced from the terminal. The parts of the door may be inserted over this work-supporting member to provide a support within the door with which the opposite terminal of the machine may coact in effecting the welds. Furthermore, this work-supporting member is rotatable relatively to the terminal on which it is mounted so that the welds can be made along each edge of the door structure other than that edge which is open. Preferably, the rotatable work-supporting member is provided with means for locking it in any desired position of rotation to prevent movement thereof while the welds are being made along one side of the door.

The preferred embodiment of the invention is illustrated in the accompanying drawings in which—

Figure 3:
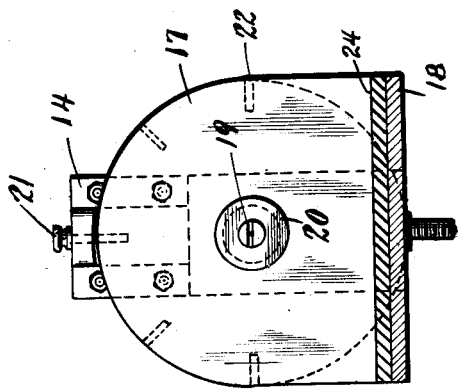
Figure 4:
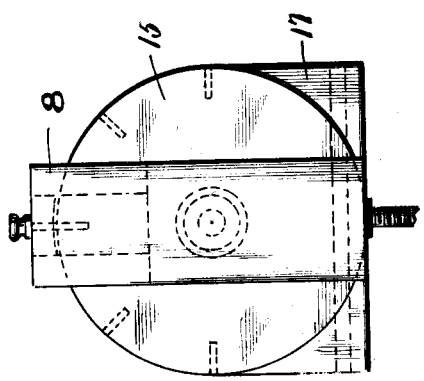

Figure 1 is an elevation of the machine. Fig. 2 is an elevation of the machine from one side thereof, Fig. 3 is a sectional detail view on line 3—3 of Fig. 1, Fig. 4 is an elevation of the lower terminal construction from the side opposite that shown in Fig. 2, and Figs. 5, 6 and 7 are views of a form of door which may be made on the machine.

Referring to these drawings, 8 and 9 indicate the lower and upper terminals of a welding machine; the machine may be of any desired construction and therefore I have illustrated the parts of the machine other than the terminals thereof diagrammatically. If desired, the lower terminal 8 may be arranged for vertical adjustment in any suitable manner. The upper terminal 9 is adapted to be moved vertically in order to subject the parts to be welded to pressure and close the electric circuit through them. For this purpose I have shown the upper terminal 9 connected by a toggle 10 to a suitable operating lever 11 which may be moved in order to raise and lower the terminal 9. The terminals 8 and 9 are connected in an electric circuit which includes the secondary 12 of a transformer, the primary of which is indicated at 13.

The terminal 8 has a member 14 mounted thereon which member is preferably a casting of copper; the main portion 15 of the member 14 is in the form of a disk which lies against the side of the terminal 8. At its upper end this disk 15 is provided with integral, laterally-extended ears 16 to facilitate bolting the casting 14 to the terminal 8. The casting 14 has a circular boss formed thereon concentric with the disk 15 which boss forms a pivotal support for a member 17. The preferred shape of this member is best shown in Fig. 3 from which it will be seen that the upper portion of the member is semi-circular, and of the same size as the upper portion of the disk 15; the lower portion of member 17, however, is rectangular and at its lower edge it is provided with an integral, laterally extending, horizontally disposed flange 18. The member, or plate 17, is mounted upon the boss on the disk 15 so as to be rotatable thereon and is secured to the disk 15 by a bolt 19 which screws into the boss on disk 15, a washer 20 being inserted between the head of bolt 19 and the plate 17. At its upper end the casting 14 overhangs the edge of the plate 17, as shown in Figs. 1 and 3, and this overhanging portion is provided with an opening to receive a pin 21. The plate 17 is provided with a plurality of openings 22 at intervals around the curved portion thereof, so that when the plate 17 has been turned to any desired position about the boss on disk 15, it may be locked in that position by inserting the pin 21 through the opening in casting 14 and into an appropriate opening 22.

The work-supporting member is shown at 23. At its lower end it is provided with an integral flange 24 which is adapted to be mounted upon the flange 18 and secured thereto by bolts 25. The body-portion, or upwardly extending portion, of the member 23, is shaped to correspond with the shape of the article to be welded upon the machine. In fact, each machine may be provided with a plurality of work-supporting members 23 differing in shape, and any one of these may be selected in accordance with the work to be done upon the machine. As the work-supporting member is removably supported upon the flange 18 by the bolts 25, the substitution of one member for another of different shape may be readily effected.

The upper terminal 9 of the machine has a member 26, preferably a casting of copper, secured thereto and directly overlying the work-supporting member 23. This member 26 may be such that, on operation of the handle 11, it will be brought down into engagement with the work on the member 23; if desired, however, a tool may be provided for insertion between the end of member 26 and the work on support 23, which tool carries the current to the parts to be welded and is shaped to confine the welding to the desired area; such a tool is shown at 27 in Figs. 1 and 2, its upper end being flat for engagement with the member 26 and its lower end being reduced to the size desired for the welding area.

Figure 7:
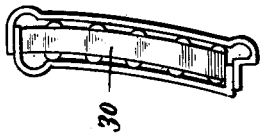
Figure 5:
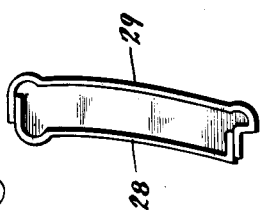

In Figs. 5, 6 and 7, I have shown a door structure which may be readily made on the machine above described, but it will be understood that the features of my invention are in no way limited as to the character of the devices made therewith. In Figs. 5 and 6 a door, such as may be used upon an automobile, is shown, this being made from two pieces of sheet-metal 28 and 29, of rectangular form, each of which is provided with an integral flange extending along three sides thereof. These two sheet-metal pieces are assembled in the manner shown in Fig. 5 and when so assembled constitute a hollow structure of rectangular form closed along three edges and open at the fourth edge. When these two sheet-metal pieces are formed and assembled as indicated in Figs. 5 and 6, they are inserted over the upper end of the work-supporting member 23 so that the end of member 23 is in engagement with the interior of the flange along one edge of the door structure. Preferably, a member 23 is selected which is of such shape that both of its lateral edges are in contact with the interior of the flanges along the side edges of the door structure. This having been done, the tool 27 is positioned upon the work at the proper point, as shown in Figs. 1 and 2, and then the member 26 is brought downwardly into engagement with the upper end of the tool and the current is caused to flow through the two terminals, the tool 27 and the work on the member 23. When the weld has been made, the tool 27 is moved along to new points and other welds are made in a similar manner. Then the tool is withdrawn temporarily and pin 21 is withdrawn, whereupon the plate 17, the work-supporting member 23 and the work on member 23 are rotated through 90° whereupon the pin 21 is inserted in another hole 22 in disk 17 so as to hold the disk 17, member 23 and the work in the new position to which they have been moved. This having been done, welds are made along the side edges of the door structure and thereafter the parts are positioned for welding along the opposite edge. After the parts of the door have been united thus, the structure may be completed in any suitable manner, as for instance, by inserting a rib 30 (Fig. 7) between the side plates of the structure and welding these plates to the rib.

The construction herein shown and described permits of making such parts as the automobile door shown in the drawings with substantial rapidity, as a result of which the cost of producing such parts is materially reduced. The upwardly projecting member 23 forms a means for supporting the work upon the machine while effecting the welds and this member with the work thereon may be readily adjusted so as to bring the desired points successively into position for effecting the welds. In some cases it is necessary to clamp the parts for a sheet-metal structure together while effecting the welds therein; with the machine illustrated, one such clamping only will be necessary as the clamps may remain in position holding the parts while all the necessary welds connecting the two sheet-metal plates are made.

Having described my invention, what I claim as new therein and desire to secure by Letters Patent of the United States is:

1. In a welding machine, the combination of a terminal and a work-supporting member mounted thereon and electrically connected thereto, said member projecting upwardly from its point of support and being rotatable relatively to the terminal, substantially as set forth.

2. In a welding machine, the combination of a terminal and a work-supporting member mounted thereon and electrically connected thereto, said member projecting upwardly from its point of support and being rotatable relatively to the terminal about an axis above the point of support, substantially as set forth.

3. In a welding machine, the combination of a terminal and a work-supporting member removably mounted thereon and electrically connected thereto, said member projecting upwardly from its point of support and being rotatable relatively to the terminal, substantially as set forth.

4. In a welding machine, the combination of a terminal and a work-supporting member removably mounted thereon and electrically connected thereto, said member projecting upwardly from its point of support and being rotatable relatively to the terminal about a horizontal axis above the point of support, substantially as set forth.

5. In a welding machine, the combination of a terminal and a work-supporting member electrically connected to the terminal and mounted on the terminal so as to have one end spaced apart from the terminal, said member being rotatable relatively to the terminal about an axis between said end and the point of connection of the member to the terminal, substantially as set forth.

6. In a welding machine, the combination of a terminal, a work-supporting member electrically connected to the terminal and mounted on the terminal so as to have one end spaced apart from the terminal, said member being rotatable relatively to the terminal about an axis between said end and the point of connection of the member to the terminal, and means for locking said member in various positions in its range of rotation, substantially as set forth.

7. In a welding machine, the combination of a terminal, a work-supporting member mounted thereon and electrically connected thereto, said member projecting upwardly from the point of support and being rotatable relatively to the terminal, and means for locking said member in various positions in its range of rotational movement, substantially as set forth.

8. In a welding machine, the combination of a terminal, a work-supporting member removably mounted thereon and electrically connected thereto, said member projecting upwardly from its point of support and being rotatable relatively to the terminal about a horizontal axis above the point of support, and means for locking said member in various positions in its range of rotational movement, substantially as set forth.

9. In a welding machine, the combination of a terminal, a plate pivotally mounted upon the terminal, and a work-supporting member secured to said plate at a point distant from the pivotal connection of the plate to the terminal, substantially as set forth.

10. In a welding machine, the combination of a terminal, a plate pivotally mounted on the terminal, means for locking the plate against rotation in various positions of angular adjustment relatively to the terminal, an integral flange on said plate distant from the pivotal connection of the plate to the terminal and a work-supporting member having an integral flange thereon which is detachably secured to the flange on said plate, substantially as set forth.

This specification signed and witnessed this 19th day of September, 1912.

JAMES H. GRAVELL.

Witnesses:
JOHN B. KILBURN,
D. S. EDMONDS.